United States Patent [19]

Bailey

[11] 3,978,345
[45] Aug. 31, 1976

[54] SYSTEM FOR UTILIZING ENERGY IN A FLUID CURRENT

[76] Inventor: David Zabriskie Bailey, 214 Bowen St., Providence, R.I. 02906

[22] Filed: May 24, 1974

[21] Appl. No.: 473,240

[52] U.S. Cl. ................................. 290/54; 290/43; 416/111; 416/87
[51] Int. Cl.² .................................... F03B 13/105
[58] Field of Search ................ 290/2, 9, 54, 55, 44, 290/45; 416/8, 9, 87, 111, 119

[56] References Cited
UNITED STATES PATENTS

| 365,133 | 6/1887 | Kessler | 416/9 |
|---|---|---|---|
| 407,123 | 7/1889 | Santy | 416/8 |
| 1,321,415 | 11/1919 | Brown | 290/55 |
| 1,355,386 | 10/1920 | Christensen | 416/8 |
| 1,654,165 | 12/1927 | Felt | 290/55 |
| 3,231,220 | 1/1966 | Fischer | 416/87 |
| 3,407,770 | 10/1968 | Baily | 114/66.5 H |
| 3,877,836 | 4/1975 | Tompkins | 416/111 |

FOREIGN PATENTS OR APPLICATIONS

| 554,005 | 1943 | United Kingdom | 416/111 |
|---|---|---|---|
| 21,436 | 1911 | United Kingdom | 416/111 |
| 285,911 | 1928 | United Kingdom | 410/111 |
| 319,963 | 1929 | United Kingdom | 416/119 |

Primary Examiner—Robert K. Schaefer
Assistant Examiner—John W. Redman
Attorney, Agent, or Firm—Brooks Haidt Haffner & Delahunty

[57] ABSTRACT

Foil elements capable of generating lift forces and converting such forces into rotational movement of a body are suspended and submerged in a flowing stream or fluid current. Control means are provided to cyclically regulate the angles of attack of the foil elements in relation to the fluid current and to maintain substantially constant lift forces throughout a rotational cycle. Power take-off and/or generating means is included in the system.

10 Claims, 8 Drawing Figures

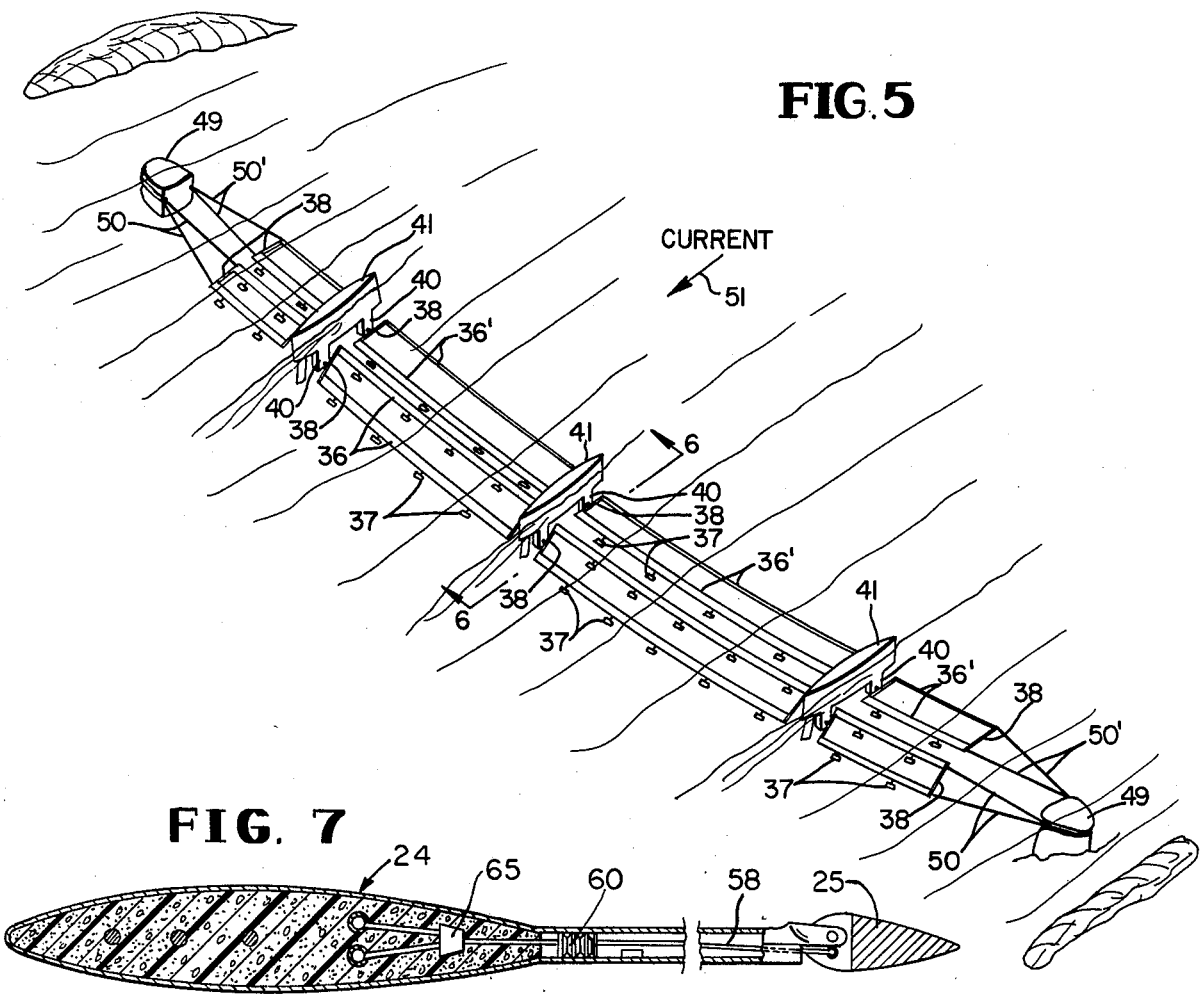
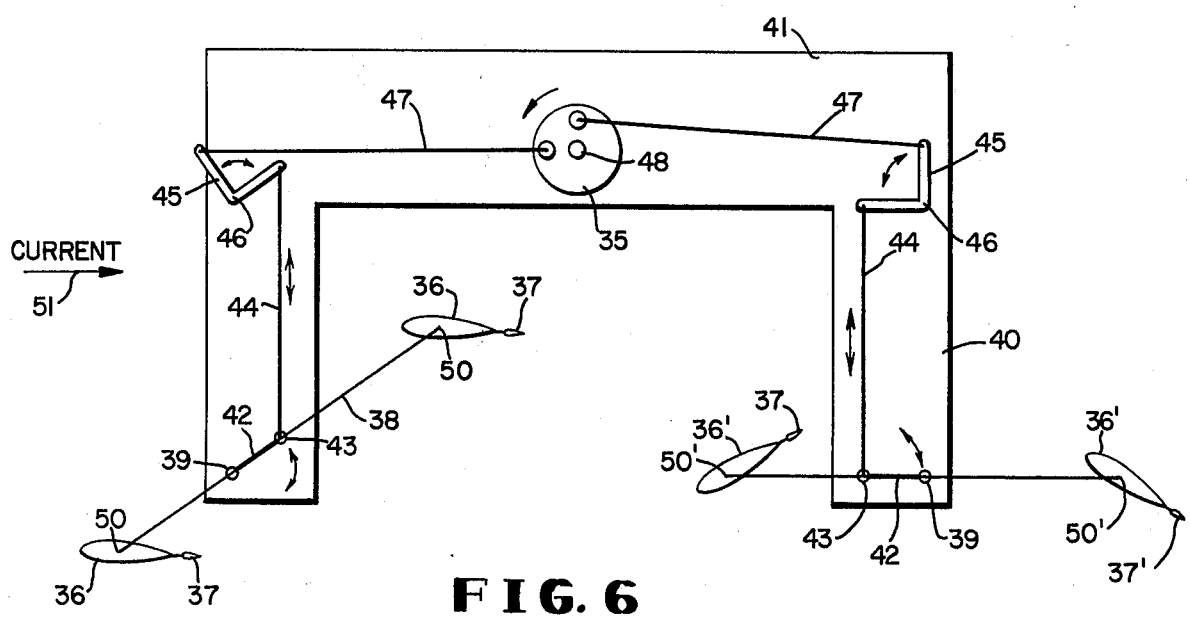

3,978,345

SYSTEM FOR UTILIZING ENERGY IN A FLUID CURRENT

BACKGROUND OF THE INVENTION

Various devices and systems have been proposed in the prior art for harnessing the energy of flowing streams, ocean currents and tides. Such devices and systems generally have not proven practical or economically feasible because of complexity and lack of durability enabling the apparatus components to withstand the rigors of nature.

There is an ever-increasing need for a simple, practical and economical means for utilizing the abundant energy present in flowing streams of water, ocean currents and the like. This need has become more urgent recently due to the much-publicized worldwide energy shortage. Consequently, it is the objective of this invention to provide a very simple, practical, reliable and economically feasible means or system for utilizing the almost infinite energy present in flowing streams, including rivers, ocean currents and the like.

The system embodying the invention in its basic essentials comprises a firmly anchored strong cable suspension means which spans a flowing stream of water. At spaced intervals on the cable suspension means, flotation barges are attached to assure a rather stable and uniformly supported stretch of the suspension cable system across the main body of the stream. In a preferred form of the invention, a corresponding number of rotors are suspended from the flotation barges with their rotational axes transverse to the fluid current and the rotors turning in generally vertical planes.

Intervened with the flotation barges and rotors and pivotally mounted on individual suspension cables are lifting foils and associated controls for cyclically regulating the angles of attack of the foils relative to the fluid current and for assuring a relatively constant resultant lift force from each foil during its complete rotational cycle. The resultant forces produced through the foil elements generate unidirectional rotation of the rotors with the suspension cables, and the rotor movement in turn activates useful power generating means.

Land anchored structural masses or piers located on opposite sides of the main stream support the suspension cable terminals for free rotation with the rotors, as induced by the lift foil elements.

In accordance with a second embodiment of the invention, paired foil elements suspended and submerged in a flowing stream on oscillatory crank arms respond to lift forces generated by the stream and through suitable linkages produce unidirectional rotation of float mounted generator driving rotors.

Other important features and advantages of the invention will become apparent during the course of the following detailed description.

BRIEF DESCRIPTION OF DRAWING FIGURES

FIG. 5 is a partially schematic perspective view showing a modification of the apparatus.

FIG. 6 is a diagrammatic view taken approximately on line 6—6 of FIG. 5.

FIG. 7 is an enlarged fragmentary sectional detail of a hydrofoil and control vane.

DETAILED DESCRIPTION

Figure 1:
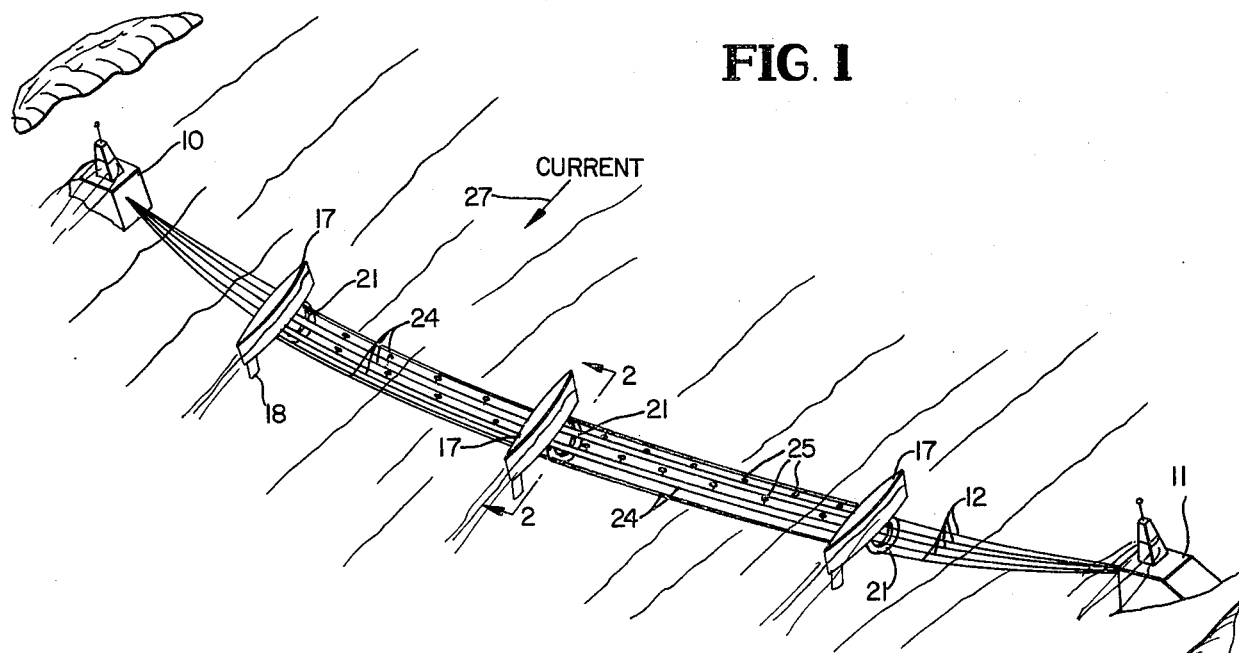
FIG. 1 is a partly schematic perspective view of an apparatus or system for utilizing energy contained in a fluid stream.

Referring to the drawings in detail, wherein like numerals designate like parts, and referring initially to FIGS. 1 through 4A, a pair of massive piers or anchorages 10 and 11 are constructed on opposite sides of a flowing stream, such as a river, as shown in FIG. 1. The piers 10 and 11 will be formed of concrete and may be located on dry land or partially or wholly within the stream and on its bottom near opposite sides of the main usable current body.

Suspended from the piers 10 and 11 and spanning the stream transversely is a cable suspension harness consisting in the illustrated embodiment of five separate suspension cables 12. It will be understood that a different number of cables could be employed and the invention is not restricted in its scope to a precise number of cables or a precise number of foil elements, to be described, associated therewith.

As the flowing stream will cause rotation of the suspension cable harness, the opposite terminal ends of the cable 12 are firmly secured to an anchoring element or cone 13, and the latter is rigidly secured to an end rotational shaft 14 passing through a prepared opening in the adjacent pier 10 or 11. Contained within a cavity of the concrete pier 11 is a preferably tapered low friction thrust bearing component 15 receiving rotatably a second bearing component 16 attached firmly to the shaft 14. By this means, or an equivalent means, the opposite ends of the suspension cable harness are firmly anchored and are rendered free to rotate during the operation of the apparatus.

A plurality, such as three, streamlined flotation barges 17 equipped at opposite ends with stabilizing rudders 18 are located in mid-stream and on opposite sides of mid-stream, FIG. 1. These flotation barges may house and carry conventional power take-off and/or generating equipment designated generally by the numeral 19, FIG. 2, and including a rotary input element or gear 20. Suspended from each flotation barge, preferably directly below it centrally, is a rotor ring 21 which may have peripheral gear teeth 22 to mesh with the teeth of the generator gear 20. Each rotor ring 24 is suspended for free rotation beneath its flotation barge 17 through a pair of spring-biased roller suspension cradles 23 which serve yieldingly to urge the rotor ring into contact with the generator gear 20 while allowing a degree of movement of the rotor at times due to current turbulence and other natural forces. Should the rotor ring momentarily separate from the power generator gear, the spring-biased cradles will move the two components back into proper engagement.

Figure 2:
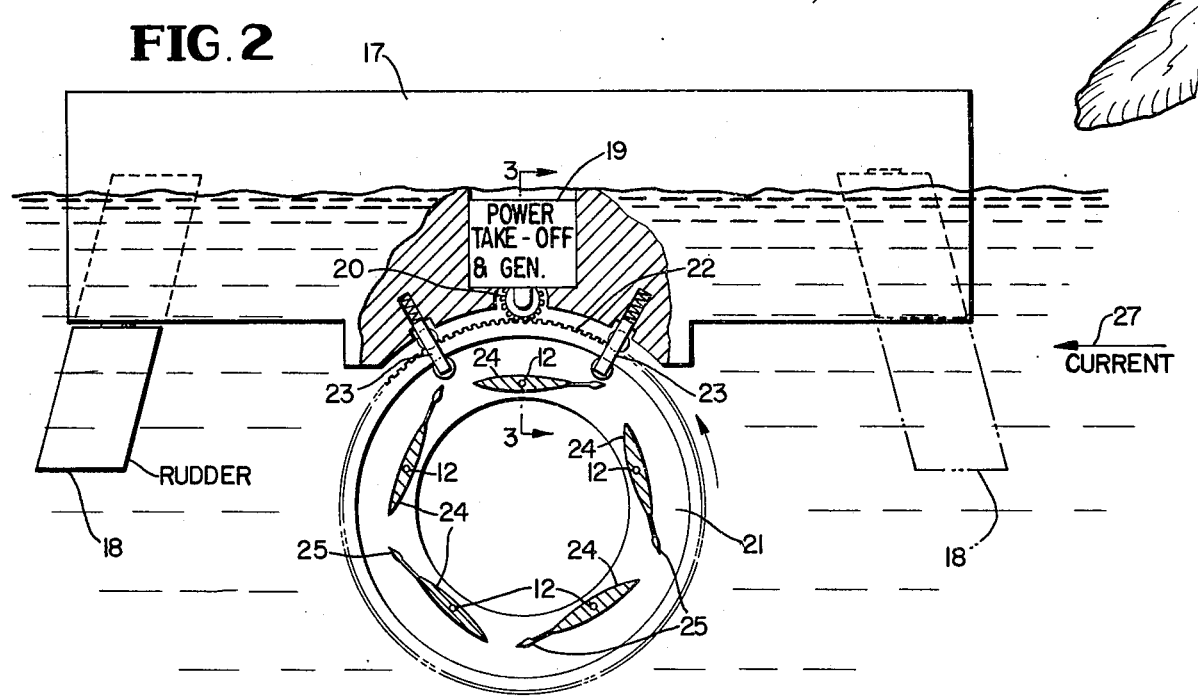
FIG. 2 is an enlarged fragmentary vertical section on line 2—2 of FIG. 1.
Figure 3:
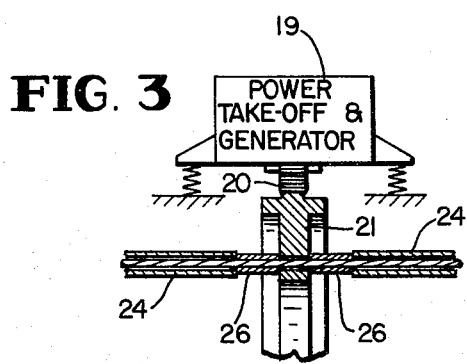
FIG. 3 is a fragmentary vertical section on line 3—3 of FIG. 2.

Extending between the several barges 17 and rotor rings 21 are plural circumferentially spaced lifting foil elements or blades 24, corresponding in number to the suspension cables 12 and receiving the cables 12 centrally therethrough, as shown in FIG. 2, whereby the sectional foil elements are supported on the cables symmetrically and may pivot thereon in response to the operation of certain trailing control vanes 25 associated with the foil elements. The cables 12 also pass through registering openings in the rotor rings 21 and pass under the several flotation barges and are continuous or unbroken between their terminal ends secured to the cones 13. Consequently, the entire assemblage of cables 12, lift foils 24 and rotor rings 21 is mounted or suspended across the fluid stream for stream-induced unidirectional rotation, in a manner to be further explained. As shown in FIG. 3, spacers 26 may be utilized on the suspension cables on opposite sides of rotor rings 21 to separate the ends of the rather long blade-like foils 24 slightly from the rotor bodies and to render the construction generally more stable.

It should be noted as the drawings illustrate that the rotational axes of the rotor rings 21 are approximately aligned and extend transversely of the fluid stream generally at right angles to the flow. Therefore, the rotor rings will turn in approximately vertical planes parallel to the direction of flow for minimum drag. It may now be appreciated that the entire structure is conceived for minimum mass and minimum drag. It is highly compact and involves few parts. The flexible suspension means renders the system self-adjusting and self-conforming within limits to certain inherent current flow variables and therefore is much more reliable, practical and also more durable than purely rigid mechanisms which cannot yield or conform.

The basis of the operation of the apparatus is the unique ability of the foil elements 24 to impart unidirectional rotation to the assemblage composed of the rotor rings 21, cables 12 and the foils themselves. To do this, the lift forces induced through the foils 24 by the flowing fluid current and more particularly a resultant generally tangential force is utilized.

Figure 4:
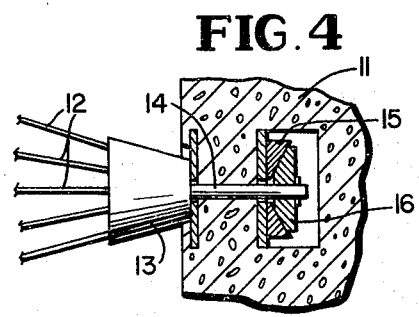
FIG. 4 is an enlarged fragmentary sectional detail of suspension cable anchorage and rotational bearing means.
Figure 4A:
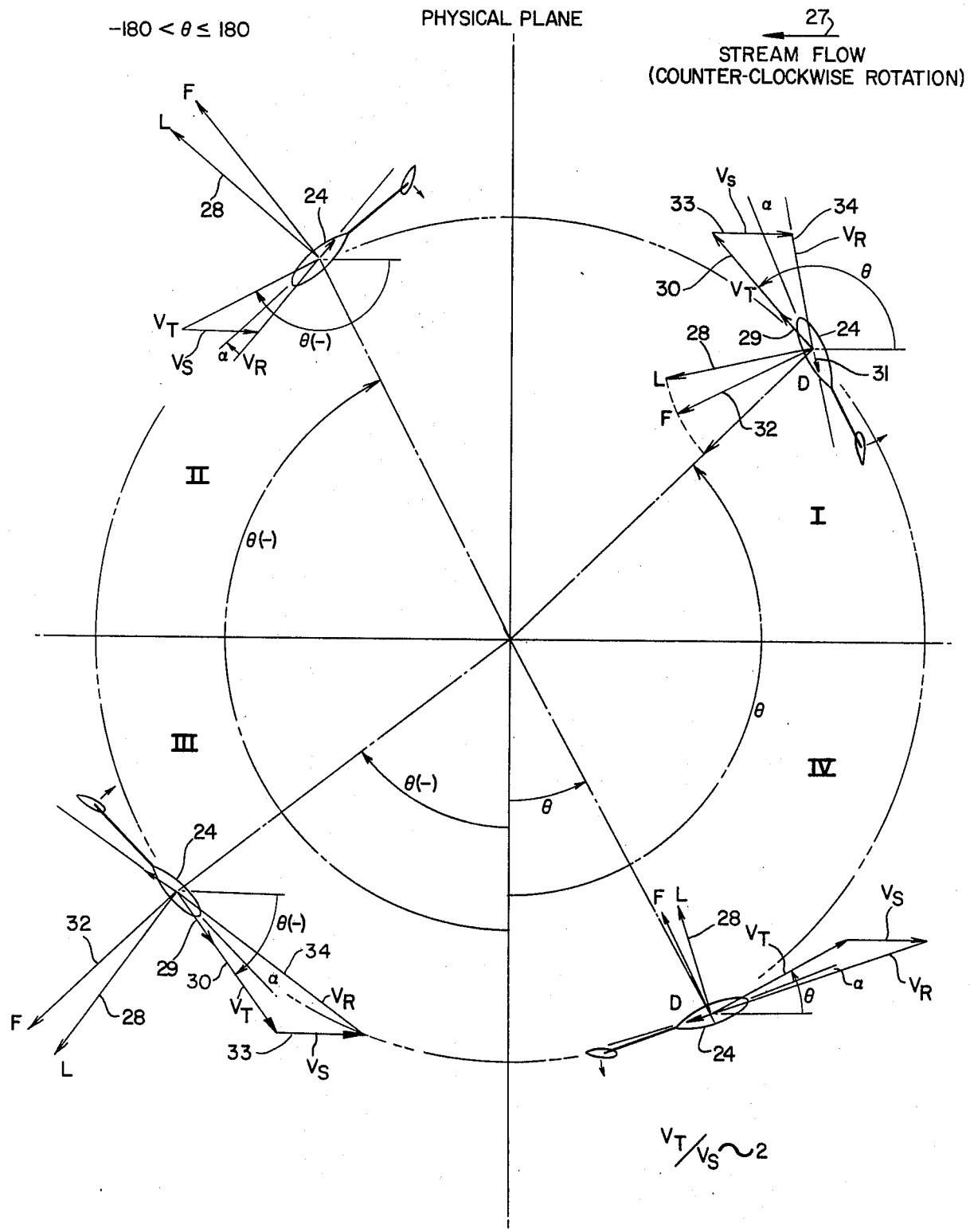
FIG. 4A is a vector diagram illustrative of the cyclically changing forces created on the rotating foil elements by the fluid current or stream.

Referring to FIG. 4A, four of the foils 24 are depicted in four different quadrants of a circle. The diagram is equally applicable to five or more foils but has been simplified for ease of illustration and description. With the stream flow in the direction of the arrow 27, the lift force on the foil 24 in quadrant I is indicated by the vector 28 both as to magnitude and direction. It will be observed how this corresponding lift vector 28 changes in the other quadrants, both in magnitude and direction. To compensate for this and to maintain the lift effect and therefore the rotation-inducing effect of the foils approximately constant during a full rotation, the control vanes 25 of the foils are brought into play. As shown in FIG. 7, and with reference to U.S. Pat. No. 3,407,770, issued Oct. 29, 1968, to D. Z. Bailey on a Hydrofoil, the attitude of the lift foil 24 is influenced and controlled by an adjustable vane 25, regulated by hydraulic means 65 including bellows 60 and a link or rod 58. By utilization of the remote hydraulic or other fluid pressure control means, the control vanes 25 and ultimately the pivoted foils 24 will have their attitudes or angles of attack cyclically changed automatically during their circular paths of movement through the fluid medium for the specified purpose of maintaining a relatively constant lift factor.

Referring further to FIG. 4A, the actual rotational forces induced on rotor rings 21 by foils 24 are represented by what could be termed tangential torque vectors 29 which will always coincide with rotational velocity vectors 30 as to direction. The diagram also includes vectors 31 representative of drag on the foils and resultant force vectors 32, which are the resultant of lift vector 28 and drag vector 31. The velocity of the stream is indicated in the diagram by vector 33, and the vector 34 is the resultant of vectors 30 and 33.

Additionally, the system must be able to compensate for variance in stream velocity at different zones in the stream transversely thereof. In other words, the entire stream may not move at a constant velocity, and this could result in faster turning or slower turning of one or more rotor rings 21 and therefore a twisting or fouling of the cable suspension harness, as well as the long foils 24. Therefore, as in U.S. Pat. No. 3,407,770, the system will embody sufficiently separated control fluid channels or passages to allow independent controlling of the vanes 25 and therefore independently controlling the attitudes of the foils 24 to compensate for variations in stream velocity, as encountered in different lateral zones.

In the operation and control of the lift foils 24 and their ability to induce steady unidirectional rotation on the structure, there is a strong although inexact analogy to the operation of a helicopter lift rotor and its cyclic pitch controls which cause the individual rotor blades to vary their pitch cyclically and automatically during a complete circle of movement. This is necessary to compensate for changes in relative velocity and therefore lift as the rotor blades are moving into the air in the direction of flight or receding therefrom during rotation. The same general cyclic control of the angle of attack of foils 24 to compensate for continually changing relationship of the foils to the moving stream are utilized here. Therefore, as the stream of current flowing in the direction of the arrow 27 constantly impinges on the several foils 24 in different locations of the latter, they will collectively develop a tangential torque-producing force 29, FIg. 4A, and these forces will be maintained relatively constant throughout the entire cycle or circular path of movement of the foil, with the necessary compensating adjustments of vanes 25 occurring as required.

The induced rotation on the rotor rings 21 and all of the structure will drive the input gears 22 and thereby activate the power generating means 19 which produce electrical power which can be delivered to any desired location of use by conventional transmission means.

Proceeding to FIGS. 5 and 6, a modification of the invention is illustrated wherein unidirectional rotation is imparted to a generator element 35, corresponding in its purpose to gear 20 by an out of phase cyclic oscillatory movement of paired lifting foils 36 and 36'. The paired foils also have their individual control vanes 37 which function like the previously-described vanes 25 for similar compensating control of the foils in the moving fluid medium. More particularly, in the modification, the paired foils 36 and 36' are carried by rocker frames 38 which are pivoted at 39 to depending legs 40 of flotation barges 41. Short cranks 42 moving with the frames 38 are pivoted at 43 to longer upstanding shifter links 44 which are in turn pivoted to bell cranks 45, the latter being pivoted at 46 to the flotation barge 41. Finally, corresponding arms of bell cranks 45 are connected by additional links 47 to the rotary element 35 mounted for rotation at 48 on the flotation barge.

As in the prior embodiment, concrete anchorages 49 are established on opposite sides of the stream and secures to these anchorages are pairs of suspension cables 50 and 50'. These paired cables extend longitudinally through the paired blade-like foils 36 and 36' in substantially the manner that the cables 12 extend through the foils 24 of the previous embodiment. The cables are outside of the flotation barges 41, see FIG. 6, and are uninterrupted between the anchorages 49 as they span the stream and support the entire apparatus conjointly with the flotation barges.

During operation, while utilizing the same variable lift phenomenon, the paired lift foils 36 and 36' will oscillate with their connecting frames 38 around the axes of pivots 39. In so doing, the linkages 42–44–4–5–47 will be activated alternately in proper sequence to impart unidirectional rotation to each rotary input element 35 of the system, the latter being connected to suitable power generating means. The out of phase oscillatory movement of the two sets of paired foils assures continuous unidirectional rotation at 35. In relation to the fluid current indicated by the arrow 51, FIGS. 5 and 6, the attitudes or angles of attack of the foils 36 and 36' will be cyclically adjusted in roughly the manner previously described to provide relatively constant lift forces and relatively even and continuous rates of oscillation for the paired foils. The same compensation for variances in stream velocity at different lateral zones of the stream can also be taken care of generally as described in the prior embodiment.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An apparatus for utilizing the energy in a fluid stream comprising a pair of anchorage means in fixed positions spaced apart transversely relative to said stream, elongated suspension means spanning said stream transversely of stream flow and having a pair of end portions, each end portion being attached to a said anchorage means, at least one lift foil element attached to said suspension means and being aligned therewith submerged in said stream and thereby extending transversely of said stream flow, and useful power generating means connected with and driven by movement of said lift foil element responsive to forces induced thereon by the moving stream.

2. The apparatus as defined by claim 1, and said suspension means being flexible.

3. The apparatus as defined by claim 2, and flotation means connected with the flexible suspension means at at least one position therealong in said stream.

4. The apparatus as defined by claim 3, and said flotation means comprising plural spaced flotation barges for said suspension means in said stream.

5. The apparatus as defined by claim 1, and said suspension means and lift foil element being mounted for rotational movement in said stream relative to said anchorage means in response to a resultant force induced on said lift foil element by said stream.

6. The apparatus as defined by claim 1, and said suspension means consisting of a flexible suspension cable harness having plural cable strands, means attaching the ends of said harness to the spaced anchorage means for free rotation, a lift foil section mounted on each cable strand, plural spaced rotors attached to the cable strands for turning therewith and with the lift foil section, spaced flotation units in the stream adjacent said rotors and carrying said power generating means and having a supportive connection with the rotors, and cyclic attitude control means for the individual foil sections enabling them to adjust and compensate for variances in stream flow rate and changes in the relative relationship of the foil sections to stream flow direction.

7. The apparatus as defined by claim 1, wherein said suspension means comprises paired flexible suspension elements attached to the spaced anchorage means, a lift foil section carried by each suspension element and being independently pivotal thereon, rocker means carrying the paired foil sections and the suspension elements to which they are attached, and mechanism adapted to drive useful power generating means coupled with said rocker means and operated by the latter in response to moving stream induced forces on said paired foil sections.

8. The apparatus as defined by claim 7, and flotation units spaced laterally in said stream and being attached to said rocker means and supporting said mechanism.

9. The apparatus as defined by claim 7, and an individually remotely controllable attitude control vane for each lift foil section and coupled therewith and being submerged with the lift foil section in said stream.

10. The apparatus as defined by claim 1, wherein said suspension means has opposite ends secured to the space anchorage means for free rotation relative thereto, at least one flotation unit in said stream adjacent the suspension means, at least one rotor suspended rotatably from the flotation unit and attached to the suspension means to rotate therewith, and plural individually adjustable circumferentially arrayed lift foil elements on the suspension means and causing rotation of the latter with said rotor responsive to stream induced forces on the lift foil sections.

* * * * *